(12) United States Patent
Mizuguchi

(10) Patent No.: US 7,099,124 B2
(45) Date of Patent: Aug. 29, 2006

(54) MAGNETORESISTIVE-EFFECT THIN FILM, MAGNETORESISTIVE-EFFECT ELEMENT, AND MAGNETORESISTIVE-EFFECT MAGNETIC HEAD

(75) Inventor: Tetsuya Mizuguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 10/872,634

(22) Filed: Jun. 21, 2004

(65) Prior Publication Data

US 2005/0105221 A1   May 19, 2005

Related U.S. Application Data

(62) Division of application No. 09/784,747, filed on Feb. 15, 2001, now Pat. No. 6,765,769.

(30) Foreign Application Priority Data

Feb. 18, 2000 (JP) ............ P2000-046837
Jul. 13, 2000 (JP) ............ P2000-213254

(51) Int. Cl.
*G11B 5/33* (2006.01)
(52) U.S. Cl. ................. 360/324.12
(58) Field of Classification Search ........... None
See application file for complete search history.

(56) References Cited

U.S. PATENT DOCUMENTS 6,303,218 B1  10/2001  Kamiguchi et al.
6,407,890 B1   6/2002  Gill
6,556,390 B1   4/2003  Mao et al.
6,597,547 B1 * 7/2003  Kawawake et al. .... 360/324.11

FOREIGN PATENT DOCUMENTS

JP    11-168250    6/1999

OTHER PUBLICATIONS

Egelhoff, Jr. et al., "Oxygen as a Surfactant in the Growth of Giant Magnetoresistance Spin Valves," J. Appl. Phys., 1997, pp. 6142-6151, vol. 82.
Kamiguchi et al., "CoFe Specular Spin Valves with a Nano Oxide Layer," IEEE International Magnetics Conference, May 18-21, 1999, Kyongju, Korea, 2 pages.
Speriosu et al., "Spin Valves with Synthetic Ferrimagnets," IEEE International Magnetics Conference, Apr. 9-12, 1996, Seattle, Washington, 2 pages.
Veloso et al., "Spin Valves with Synthetic Ferrimagnet and Antiferromagnet Free and Pinned Layers," IEEE Transactions on Magnetics, 1999, pp. 2568-2570, vol. 35.

* cited by examiner

*Primary Examiner*—David Davis
(74) *Attorney, Agent, or Firm*—Sonnenschein Nath & Rosenthal LLP

(57) ABSTRACT

A spin-valve film used in a magnetoresistive-effect magnetic head includes an antiferromagnetic layer, a magnetization fixing layer, a non-magnetic layer, and a free layer. The magnetization fixing layer or the free layer is provided with a layered ferromagnetic structure which includes a pair of magnetic layers through the intermediary of a non-magnetic layer. In the layered ferromagnetic structure, a surface oxidation layer is formed on the surface of the non-magnetic intermediate layer to the side of the non-magnetic layer.

6 Claims, 7 Drawing Sheets

MAGNETORESISTIVE-EFFECT THIN FILM, MAGNETORESISTIVE-EFFECT ELEMENT, AND MAGNETORESISTIVE-EFFECT MAGNETIC HEAD

RELATED APPLICATION DATA

The present application is a divisional of U.S. application Ser. No. 09/784,747, filed on Feb. 15, 2001, now U.S. Pat. No. 6,765,769 which claims priority to Japanese Application No. P2000-046837, filed Feb. 18, 2000, and Japanese Application No. P2000-213254, filed Jul. 13, 2000. All applications are incorporated herein by reference to the extent permitted by law.

BACKGROUND OF THE INVENTION

1. Technical Field

The present invention relates to a magnetoresistive-effect thin film using the giant magneto-resistivity. The present invention also relates to a magnetoresistive-effect element and a magnetoresistive-effect magnetic head fabricated with the magnetoresistive-effect thin film using the giant magneto-resistivity.

2. Prior Art

Conventionally, there is a widely used magnetoresistive-effect magnetic head (hereafter referred to as the MR head) which uses magnetoresistance of a magnetoresistive-effect element (hereafter referred to as the MR element) to read signals recorded on a magnetic storage medium.

The MR element is a type of resistance element and varies electrical resistance according to an external magnetic field. The MR head reads magnetic signals recorded on a magnetic storage medium by using the fact that the MR element's electrical resistance varies with a signal magnetic field from the magnetic storage medium.

In recent years, there is an increasing need for a small, large-capacity magnetic storage medium. For example, a technique such as narrowing a recording track width accelerates the trend towards a higher recording density of magnetic storage media.

With respect to the MR head, a particular attention is paid to utilize an MR thin film based on the giant magneto-resistivity (GMR) instead of a conventional MR thin film using the anisotropic magneto-resistivity (AMR). The purpose is to prevent a signal output from decreasing due to narrowed tracks on the magnetic storage medium.

Of MR thin films using the giant magneto-resistivity, a spin-valve film comprises an antiferromagnetic layer, two ferromagnetic layers, and a non-magnetic layer. The non-magnetic layer is formed between the two ferromagnetic layers. The antiferromagnetic layer is formed adjacent to one of the two ferromagnetic layers. The ferromagnetic layer in contact with the antiferromagnetic layer is used as a pinned layer. The other ferromagnetic layer is used as a free layer. The free layer magnetization varies with an external magnetic field. The external magnetic field is detected according to a difference in magnetization directions for the pinned layer and the free layer.

The MR head tends to lower an MR element for improving outputs. Consequently, this thins the free layer in the spin-valve film. However, thinning the free layer makes the MR element asymmetric. For decreasing this asymmetry, it is only necessary to decrease demagnetization applied to the layer from the pinned layer. For this purpose, it is only necessary to decrease a magnetic moment for the pinned layer. For decreasing the pinned layer's magnetic moment, it is only necessary to thin the pinned layer. However, thinning the pinned layer decreases an MR head output.

From the viewpoint of increasing recording densities, the spin-valve film tends to thin the free layer for reducing its magnetic moment. However, thinning the free layer may degrade magnetoresistance.

To solve this, it is proposed to use a structure comprising a pair of antiferromagnetically combined ferromagnetic layers for the pinned layer or the free layer by forming a non-magnetic layer between a pair of ferromagnetic layers for the spin-valve film. This structure is called the layered ferrimagnetic structure (V.S. Speriousu et.al; The 1996 IEEE INTERMAG,AA-04). The layered ferrimagnetic structure provides a 3-layer structure by forming a non-magnetic layer between a pair of ferromagnetic layers. Adjusting the non-magnetic layer thickness antiferromagnetically binds a pair of ferromagnetic layers. The above-mentioned non-magnetic layer is generally formed of Ru, Rh, Ir, Re, and the like.

When the pinned layer uses this layered ferrimagnetic structure, a pair of antiferromagnetically coupled ferromagnetic layers decreases an apparent magnetic moment for the pinned layer. Even if the free layer is thin, demagnetization applied to the free layer decreases. This makes it possible to improve the free layer's sensitivity against an external magnetic field without excessively thinning the pinned layer.

Examples of the spin-valve film which uses the layered ferrimagnetic structure for the free layer are reported in studies by A. Veloso et al. (IEEE Trans. Magn. Vol. 35, No. 5, P2568-2570, September 1999) and the like. Since a pair of ferromagnetic layers is antiferromagnetically coupled in the free layer, an apparent magnetic moment for the free layer can be decreased by maintaining the thickness of one magnetic layer associated with magnetoresistive-effect and adjusting the thickness of the other magnetic layer not associated therewith. Accordingly, it is possible to improve the free layer's sensitivity against an external magnetic field without excessively thinning the free layer.

On the other hand, improvement of the magnetoresistive-effect change necessitates consideration of increasing a probability that electrons scatter depending on spins in the spin-valve film and improving the magnetoresistive-effect change in the spin-valve film. Incidentally, this scattering of electrons is hereafter referred to as spin-dependent scattering.

When the layered ferrimagnetic structure is applied to the free layer, however, there is provided a new magnetic layer not associated with magnetoresistive-effect. A shunt loss may occur in this magnetic layer. There is the problem that a resulting magnetoresistive-effect change is not as high as expected despite the use of the layered ferrimagnetic structure for the free layer.

Japanese Patent Application Laid-Open Publication No. 11-8424 discloses an example of the spin-valve film which increases the probability of spin-dependent scattering as mentioned above. According to this example, a metal layer which easily causes mirror reflection is formed adjacent to the pinned layer and the free layer. However, many such metal materials provide low resistivity. Consequently, a current shunts to the layer of such metal easily causing mirror reflection, raising the possibility of decreasing MR head output.

Japanese Patent Application Laid-Open Publication No. 11-168250 and the study by W. F. Egelhoff et. al. (J. Appl. Phys. 82(12), Dec. 15, 1997) provide an example of the spin-valve film which increases the probability of spin-dependent scattering as mentioned above. According to this example, an antiferromagnetic film of oxide is formed in the spin-valve film. However, the antiferromagnetic film formed of oxide does not provide a sufficient exchange coupling force with a ferromagnetic film used as the pinned layer. The antiferromagnetic film formed of oxide lacks thermal stability and does not ensure the reliability as an antiferromagnetic film compared to an antiferromagnetic film formed of presently used ordered metal.

Further, the study by Y. Kamiguchi et. al. (The 1999 IEEE INTERMAG, DB-1) provides an example of the spin-valve film which increases the probability of spin-dependent scattering as mentioned above. According to the example, the spin-valve film contains a metal oxide layer formed in the middle of a pinned layer. However, forming a metal oxide layer in the middle of the pinned layer thickens it. Thickening the pinned layer increases demagnetization applied to the free layer.

Conventionally, the spin-valve film uses a non-magnetic layer with a thickness of 2.4 to 3.2 nm formed between the pinned layer and the free layer. From the viewpoint of improving the magnetoresistive-effect change, it is desirable to make the non-magnetic layer as thin as possible. However, thickening the non-magnetic layer excessively increases an inter-layer coupling field between the pinned layer and the free layer. A change in the free layer's magnetization direction may also change the pinned layer's magnetization direction.

SUMMARY OF THE INVENTION

The present invention has been made in consideration of the foregoing. It is therefore an object of the present invention to provide a magnetoresistive-effect thin film which improves a magnetoresistive-effect change and provides high sensitivity against an external magnetic field by increasing the spin-dependent scattering probability of electrons. It is another object of the present invention to provide a magnetoresistive-effect element which can efficiently detect an external magnetic field. It is yet another object of the present invention to provide a magnetoresistive-effect magnetic head which provides high reproduction output and is suited for high-density recording.

A magnetoresistive-effect thin film according to the present invention comprises at least an antiferromagnetic layer, a magnetization fixing layer, a non-magnetic layer, and a free layer formed successively, wherein: the magnetization fixing layer or the free layer is provided with a layered ferrimagnetic structure which comprises a pair of magnetic layers through the intermediary of a non-magnetic intermediate layer; and a surface oxidation layer is formed on the surface of the non-magnetic intermediate layer to the side of the non-magnetic layer in the layered ferrimagnetic structure.

In the thus configured magnetoresistive-effect thin film according to the present invention, a surface oxidation layer is formed on the surface of the non-magnetic intermediate layer constituting the layered ferrimagnetic structure. This increases the spin-dependent scattering probability of electrons, improves the magnetoresistive-effect change, and increases sensitivity against an external magnetic field. The surface oxidation layer's interface is extremely smooth. Consequently, it is possible to further thin the non-magnetic layer formed between the magnetization fixing layer and the free layer compared to the prior art.

A magnetoresistive-effect element according to the present invention comprises at least an antiferromagnetic layer, a magnetization fixing layer, a non-magnetic layer, and a free layer formed successively, wherein: the magnetization fixing layer or the free layer is provided with a layered ferrimagnetic structure which comprises a pair of magnetic layers through the intermediary of a non-magnetic intermediate layer; and there is provided a magnetoresistive-effect thin film having a surface oxidation layer formed on the surface of the non-magnetic intermediate layer to the side of the non-magnetic layer in the layered ferrimagnetic structure.

The thus configured magnetoresistive-effect element according to the present invention is fabricated from the magnetoresistive-effect thin film with an improved magnetoresistive-effect change. This is because a surface oxidation layer is formed on the surface of the non-magnetic intermediate layer constituting the layered ferrimagnetic structure. Accordingly, the magnetoresistive-effect element increases sensitivity against an external magnetic field.

A magnetoreristive-effect magnetic head according to the present invention has a magnetoresistive-effect element comprising a pair of zonal magnetic shield members, a magnetoresistive-effect thin film formed between the pair of magnetic shield members, a pair of bias layers formed at both ends of the magnetoresistive-effect thin film along a longer direction, and a pair of thin-film lead electrodes each formed just on the bias layer on a substrate, wherein: the magnetoresistive-effect thin film constituting the magnetoresistive-effect element comprises at least an antiferromagnetic layer, a magnetization fixing layer, a non-magnetic layer, and a free layer sucessively formed; the magnetization fixing layer or the free layer is provided with a layered ferrimagnetic structure which comprises a pair of magnetic layers through the intermediary of a non-magnetic intermediate layer; and a surface oxidation layer is formed on the surface of the non-magnetic intermediate layer to the side of the non-magnetic layer in the layered ferrimagnetic structure.

The thus configured magnetoresistive-effect magnetic head according to the present invention is fabricated from the magnetoresistive-effect thin film with an improved magnetoresistive-effect change. This is because a surface oxidation layer is formed on the surface of the non-magnetic intermediate layer constituting the layered ferrimagnetic structure. Accordingly, the magnetoresistive-effect magnetic head increases sensitivity against an external magnetic field from a magnetic storage medium and improves output while reproducing recorded information.

As will be clearly understood from the above description, the magnetoresistive-effect thin film according to the present invention generates a mirror reflection by electrons and easily causes spin-dependent scattering. This is because a surface oxidation layer is formed by oxidizing the surface of the non-magnetic intermediate layer constituting the layered ferrimagnetic structure. Hence, the magnetoresistive-effect thin film improves a magnetoresistive-effect change and provides good sensitivity against an external magnetic field. The surface oxidation layer's interface is extremely smooth. Consequently, it is possible to further thin the non-magnetic layer formed between the free layer and the magnetization fixing layer compared to the prior art. This can further improve the magnetoresistive-effect change.

The magnetoresistive-effect element according to the present invention is fabricated from the above-mentioned magnetoresistive-effect thin film. Accordingly, it is possible to efficiently detect a slight change in the external magnetic field.

The magnetoresistive-effect magnetic head according to the present invention is formed of the above-mentioned magnetoresistive-effect thin film. Because of this, the head provides good sensitivity against a magnetic field from an information storage medium and produces a high output during information reproduction. Hence, the head is appropriate for high-density recording.

DETAILED DESCRIPTION OF THE INVENTION

Embodiments of the present invention will be described in further detail with reference to the accompanying drawings.

Drawings used for the following description may enlarge characteristic portions for easy understanding of these portions using clearly recognizable illustrations. Ratios of dimensions for each member may differ from actual values.

The following description exemplifies layer configurations, materials, and the like constituting a magnetoresistive-effect thin film. The present invention is not limited to the exemplified magnetoresistive-effect thin film. It may be preferable to choose proper layer configurations, materials, and the like according to intended purposes and performance.

Figure 1:
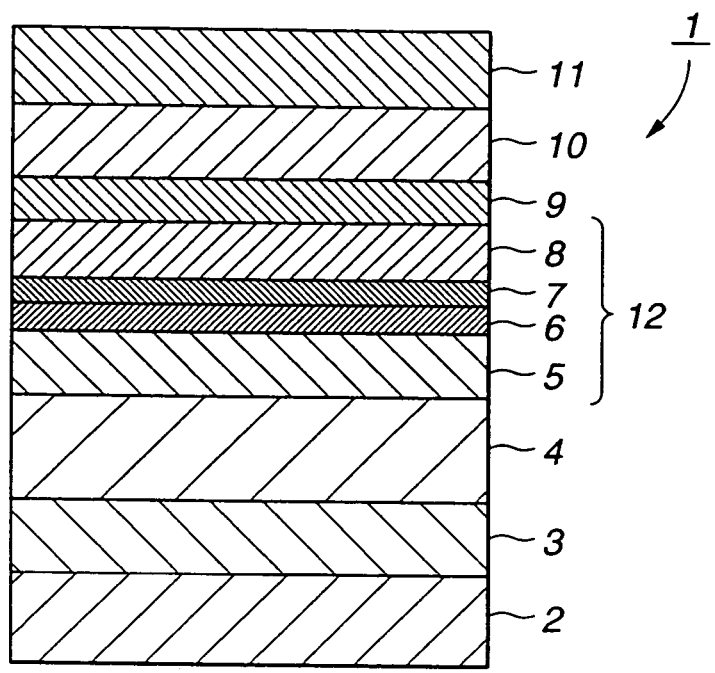
FIG. 1 is a sectional view of a bottom-type spin-valve film according to a first embodiment.

The following describes a first embodiment of the magnetoresistive-effect thin film according to the present invention with reference to FIG. 1. A spin-valve film 1 is of a so-called bottom-type and is characterized by a layered ferrimagnetic structure having a surface oxidation layer on a pinned layer.

The spin-valve film 1 comprises a base layer 3, an antiferromagnetic layer 4, a first ferromagnetic layer 5, a non-magnetic intermediate layer 6, a surface oxidation layer 7, a second ferromagnetic layer 8, a non-magnetic layer 9, a free layer 10, and a protective layer 11 which are layered successively on a substrate 2. It should be noted that the first ferromagnetic layer 5, the non-magnetic intermediate layer 6, the surface oxidation layer 7, and the second ferromagnetic layer 8 compose a pinned layer 12 having a layered ferrimagnetic structure.

The substrate 2 is formed of a nonmagnetic nonconductive material such as glass and the like.

The base layer 3 is formed of a nonmagnetic nonconductive material such as Ta. By having the base layer 3, the spin-valve film 1 improves crystal orientation. In addition, the base layer 3 prevents the substrate 2's material from contaminating thin film layers constituting the spin-valve film 1.

The antiferromagnetic layer 4 is formed of a regular antiferromagnetic material and an irregular antiferromagnetic material using Mn such as a Pt—Mn alloy, an Ni—Mn alloy, Pd—Pt—Mn alloy, and the like. It may be preferable to form the antiferromagnetic layer 4 using NiO, $\alpha$-$Fe_2O_3$, and the like. Forming the antiferromagnetic layer 4 fixes magnetization directions for the first ferromagnetic layer 5 and the second ferromagnetic layer 8 constituting the pinned layer 12 as will be described later.

The first ferromagnetic layer 5 and the second ferromagnetic layer 8 are formed of magnetic materials showing good soft magnetic characteristics such as an Ni—Fe alloy, Co, and an alloy containing one of Co, Ni, and Fe. Together with the non-magnetic intermediate layer 6 and the surface oxidation layer 7 to be described later, the first ferromagnetic layer 5 and the second ferromagnetic layer 8 form the pinned layer 12 having the so-called layered ferrimagnetic structure. The first ferromagnetic layer 5 and the second ferromagnetic layer 8 are exchange-coupled to the antiferromagnetic layer 4 to fix the magnetization direction.

Providing the pinned layer 12 with the layered ferrimagnetic structure decreases a magnetic moment on the pinned layer 12 and also decreases demagnetization applied to the free layer. The layered ferrimagnetic structure comprises a non-magnetic layer sandwiched between two ferromagnetic layers. By adjusting the non-magnetic layer thickness, the two ferromagnetic layers are coupled to each other so that each magnetization direction becomes antiparallel. It is possible to use Ru, Rh, Ir, Re, and the like for the non-magnetic layer formed in the middle of the above-mentioned layered ferrimagnetic structure.

The non-magnetic intermediate layer 6 and the surface oxidation layer 7 function as non-magnetic layers formed in the middle of the above-mentioned layered ferrimagnetic structure. The surface oxidation layer 7 is formed by oxidizing the surface of the non-magnetic intermediate layer 6. It is desirable to form the non-magnetic intermediate layer 6 of Ru with the thickness of 0.4 to 1.2 nm.

The surface oxidation layer 7 is formed by oxidizing the surface of the non-magnetic intermediate layer 6 and is made from an Ru oxide (hereafter referred to as Ru—O).

While the surface oxidation layer 7 is formed by oxidizing the surface of the non-magnetic intermediate layer 6, the thickness of the surface oxidation layer 7 generally should be 0.4 nm or less. The reason for this is not always clear. However, it is considered that the non-magnetic intermediate layer 6 is just oxidized to the depth of 0.4 nm from the surface when the surface of the non-magnetic intermediate layer 6 comprising Ru is oxidized as will be described in an embodiment 2.

Since the surface oxidation layer 7 is formed by oxidizing the surface of the non-magnetic intermediate layer 6, the surface oxidation layer 7 and the non-magnetic intermediate layer 6 almost maintain the same interface. The spin-valve film 1 is formed unbrokenly. Forming the surface oxidation layer 7 containing Ru—O smoothes the interface. This can cause the so-called mirror reflection which enables reflection and scattering of electrons by maintaining spin directions of electrons. The mirror reflection of electrons dramatically improves the probability of electron's spin-dependent scattering. Consequently, it is possible to improve a magnetoresistive-effect change for the spin-valve film 1.

The surface oxidation layer 7 is formed in the pinned layer 12 having the layered ferrimagnetic structure. This makes it possible to thin the non-magnetic layer 9 between the pinned layer 12 and the free layer 10 compared to a spin-valve film which does not have the surface oxidation layer 7. The definite reason is unknown. However, a possible reason is supposed as follows.

The following describes an experiment example for examining an effect of forming the surface oxidation layer 7.

Figure 2:
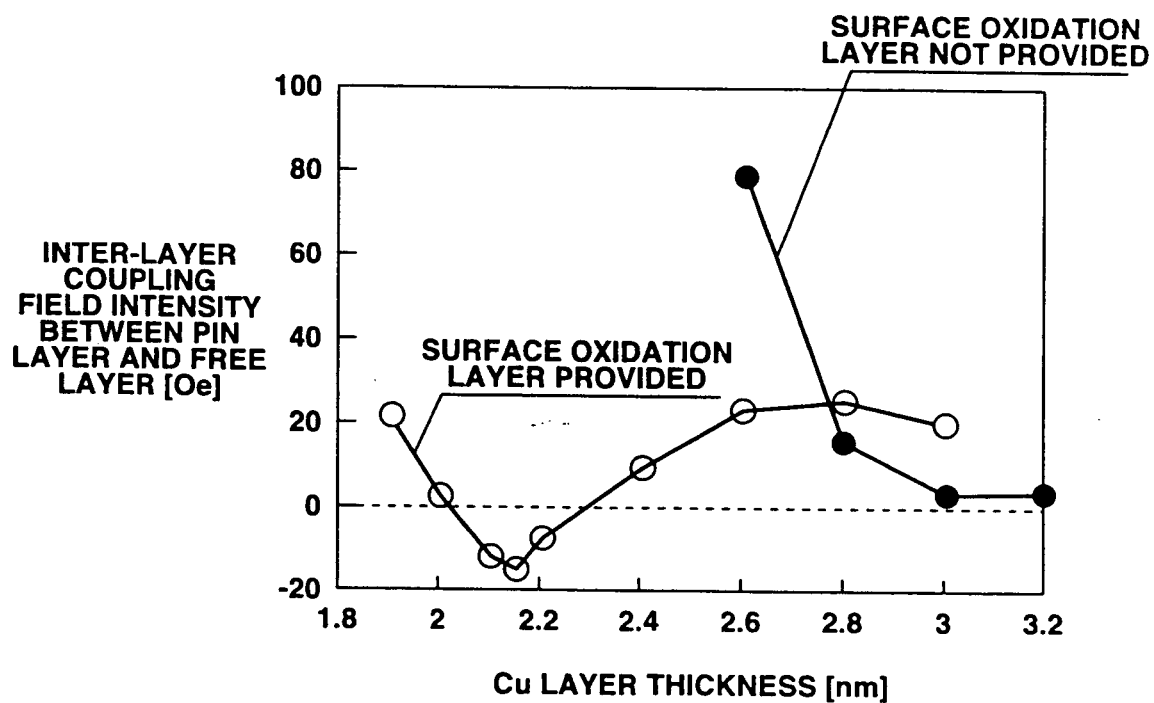
FIG. 2 is a characteristic chart showing relationship between a Cu layer thickness and an inter-layer coupling field intensity between a pinned layer and a free layer.

We actually fabricated two spin-valve films. One is structured to have the surface oxidation layer 7 comprising Ru—O in the pinned layer 12 provided with the layered ferrimagnetic structure. The other has the conventional structure without the surface oxidation layer. Using these spin-valve films, we measured intensities for an inter-layer coupling field between the pinned layer and the free layer by changing the thickness of a Cu layer equivalent to the non-magnetic layer 9. FIG. 2 shows measurement results.

The following shows the configuration of the spin-valve film having the surface oxidation layer in the pinned layer provided with the layered ferrimagnetic structure. All values in parentheses indicate layer thicknesses in nm.
Substrate/Ta (5)/NiFe (2)/PtMn (20)/CoFe (1.1)/Ru+Ru—O (0.8)/CoFe (2.2)/Cu (t)/CoFe (2.5)/Cu (1)/Ta (0.2)

The following is the configuration of the other spin-valve film which uses no surface oxidation layer in the pinned layer provided with the layered ferrimagnetic structure.
Substrate/Ta (5)/NiFe (2)/PtMn (20)/CoFe (1.1)/Ru (0.8)/CoFe (2.2)/Cu (t)/CoFe (2.5)/Ta (5)

There is a slight difference between one spin-valve film having the surface oxidation layer and the other not having the same in the pinned layer with the layered ferrimagnetic structure. However, such a difference is consider to be negligible for the comparison.

As shown in FIG. 2, the inter-layer coupling field intensity between the pinned layer and the free layer becomes minimum when the Cu layer thickness is in the range of approximately 2 to 2.4 nm for the spin-valve film having the surface oxidation layer. By contrast, for the conventional spin-valve film having no surface oxidation layer, the inter-layer coupling field intensity between the pinned layer and the free layer remarkably increases when the Cu layer thickness becomes smaller than 3 nm. Consequently, with respect to the conventional spin-valve film having no surface oxidation layer, setting the Cu layer thickness to as thin as approximately 2 nm will greatly increase the inter-layer coupling field intensity between the pinned layer and the free layer. There is a possibility that a change in the magnetization direction of the free layer could also change the magnetization direction of the pinned layer.

Since the spin-valve film 1 provides the surface oxidation layer 7 in the pinned layer 12 having the layered ferrimagnetic structure, it is possible to thin the non-magnetic layer 9 between the pinned layer 12 and the free layer 10 up to a thickness of approximately 2 nm. Accordingly, it is further possible to improve a magnetoresistive-effect change for the spin-valve film 1.

Several methods are available for forming the surface oxidation layer 7 by oxidizing the surface of the non-magnetic intermediate layer 6. For example, one method exposes the non-magnetic intermediate layer 6 to an oxygen atmosphere having a pressure lower than the atmospheric pressure. There is also provided the plasma oxidization method including ECR (electron cyclotron resonance) and the ICP (inductively coupled plasma).

The non-magnetic layer 9 is formed of a conductive non-magnetic material such as, say, Cu, Cu—Ni alloy, or the like. Forming the non-magnetic layer 9 between the pinned layer 12 and the free layer 10 provides the giant magnetoresistivity on the spin-valve film 1. As mentioned above, the non-magnetic layer 9 can be thinner than the non-magnetic layer between the pinned layer and the free layer on the conventional spin-valve film. More specifically, it is desirable to set the non-magnetic layer 9's thickness to approximately 2 nm.

The free layer 10 is formed of magnetic materials showing good soft magnetic characteristics as well as the first ferromagnetic layer 5 and the second ferromagnetic layer 8. The free layer 10's magnetization direction varies with the external magnetic field. The free layer 10 may be formed of a layered structure comprising an Ni—Fe alloy layer and a Co—Fe alloy layer. This structure makes it possible to improve the reproduction sensitivity of the spin-valve film 1.

The protective layer 11 is formed of a non-magnetic material such as Ta. Forming this protective layer 11 prevents resistivity on the spin-valve film 1 from increasing and protects the free layer 10 against soft magnetic instability.

In this spin-valve film 1, the pinned layer 12 is provided in contact with the antiferromagnetic layer 4. Consequently, the pinned layer 12 is magnetized in a given direction due to an exchange coupling force generated between the pinned layer 12 and the antiferromagnetic layer 4. Since the non-magnetic layer 9 is formed between the free layer 10 and the pinned layer 12, the free layer 10's magnetization direction easily rotates in response to a slight external magnetic field.

When an external magnetic field is applied to the thus configured spin-valve film 1, a magnetization direction of the free layer 10 is determined according to this external magnetic field's direction and intensity. The spin-valve film 1 provides the maximum electrical resistance when the magnetization direction of the free layer 10 differs from that of the second ferromagnetic layer 8 in the pinned layer 12 by 180°. The spin-valve film 1 provides the minimum electrical resistance when the magnetization direction of the free layer 10 matches that of the second ferromagnetic layer 8 in the pinned layer 12.

Accordingly, the spin-valve film 1's electrical resistance varies with an applied external magnetic field. It is possible to detect an external magnetic field by reading this resistance change.

As will be clearly understood from the above description, the spin-valve film 1 contains the pinned layer 12 having the layered ferrimagnetic structure. The pinned layer 12 includes the surface oxidation layer 7 formed by oxidizing the surface of the non-magnetic intermediate layer 6. This formation easily generates spin-dependent scattering. Further, it is possible to thin the non-magnetic layer 9 between the pinned layer 12 and the free layer 10. Owing to these features, the spin-valve film 1 improves a magnetoresistive-effect change and provides good sensitivity against an external magnetic field.

Figure 3:
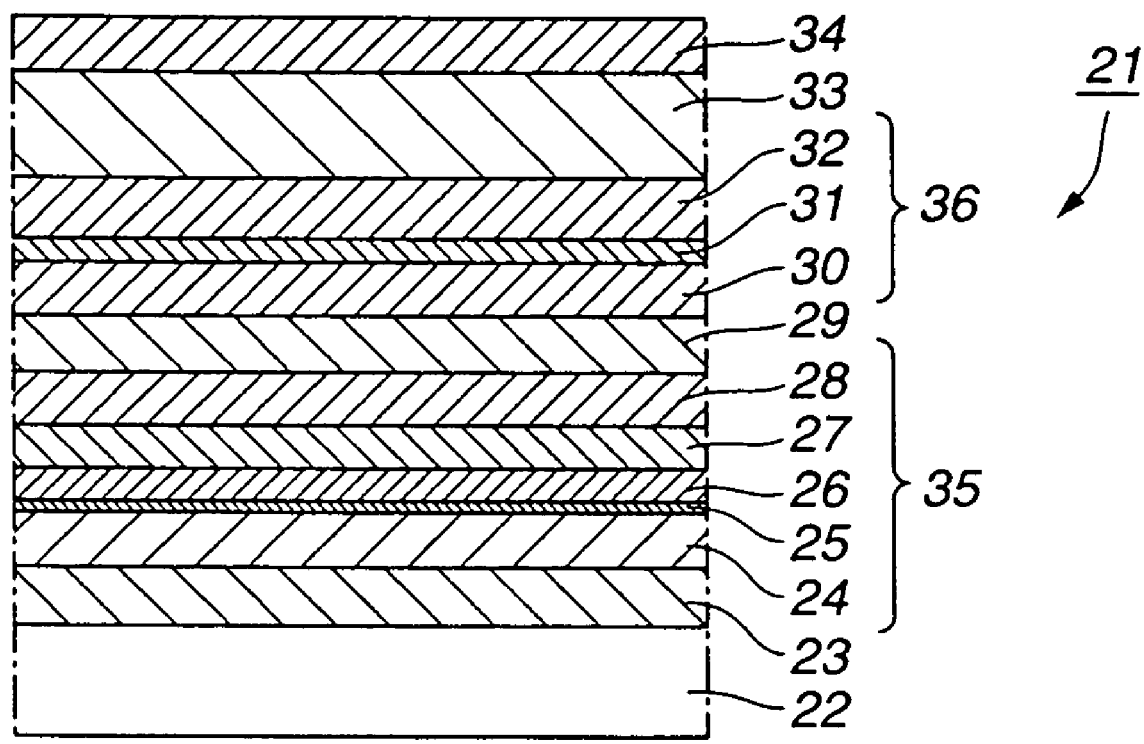
FIG. 3 is a sectional view of a top-type spin-valve film according to a second embodiment.

The following describes a second embodiment of the magnetoresistive-effect thin film according to the present invention with reference to FIG. 3. A spin-valve film 21 is of a so-called top-type and is characterized by a layered ferrimagnetic structure having a surface oxidation layer on a free layer.

The spin-valve film 21 comprises a base layer 23, a first ferromagnetic layer 24, a non-magnetic intermediate layer 25, a surface oxidation layer 26, a second ferromagnetic layer 27, a third ferromagnetic layer 28, a non-magnetic layer 29, a fourth ferromagnetic layer 30, a second non-magnetic layer 31, a fifth ferromagnetic layer 32, an antiferromagnetic layer 33, and a protective layer 34 which are layered successively on a substrate 22. It should be noted that the first ferromagnetic layer 24, the non-magnetic intermediate layer 25, the surface oxidation layer 26, the second ferromagnetic layer 27, and the third ferromagnetic layer 28 compose a free layer 35 having a layered ferrimagnetic structure. The fourth ferromagnetic layer 30, the second non-magnetic layer 31, and the fifth ferromagnetic layer 32 compose a pinned layer 36 having a layered ferrimagnetic structure.

The substrate 22, the base layer 23, the antiferromagnetic layer 33, and the protective layer 34 for the spin-valve film 21 have almost the same configurations as those of the substrate 2, the base layer 3, the antiferromagnetic layer 4, and the protective layer 11 for the spin-valve film 1 described in the first embodiment. Accordingly, detailed description about these components is omitted here.

The first ferromagnetic layer 24, the second ferromagnetic layer 27, and the third ferromagnetic layer 28 are formed of magnetic materials showing good soft magnetic characteristics such as an Ni—Fe alloy, Co, and an alloy containing one of Co, Ni, and Fe. Together with the non-magnetic intermediate layer 25 and the surface oxidation layer 26 to be described later, the first ferromagnetic layer 24, the second ferromagnetic layer 27, and the third ferromagnetic layer 28 form the free layer 35 having the so-called layered ferrimagnetic structure.

The free layer 35's magnetization direction varies with an external magnetic field. Using the layered ferrimagnetic structure for the free layer 35 can decrease an apparent magnetic moment for the free layer 35 without thinning it. This makes it possible to improve the spin-valve film 21's reproduction sensitivity.

The non-magnetic intermediate layer 25 and the surface oxidation layer 26 function as non-magnetic layers formed in the middle of the above-mentioned layered ferrimagnetic structure. The surface oxidation layer 26 is formed by oxidizing the surface of the non-magnetic intermediate layer 25. It is desirable to form the non-magnetic intermediate layer 25 of Ru with the thickness of 0.4 to 1.2 nm.

Since the surface oxidation layer 26 is formed by oxidizing the surface of the non-magnetic intermediate layer 25, the surface oxidation layer 26 and the non-magnetic intermediate layer 25 almost maintain the same interface. The spin-valve film 21 is formed unbrokenly. Forming the surface oxidation layer 26 containing Ru—O smoothes the interface. This can cause the so-called mirror reflection which enables reflection and scattering by maintaining spin directions of electrons. The mirror reflection of electrons dramatically improves the probability of electron's spin-dependent scattering. Consequently, it is possible to improve a magnetoresistive-effect change for the spin-valve film 21.

The surface oxidation layer 26 is formed in the free layer 35 having the layered ferrimagnetic structure. This makes it possible to extremely thin the non-magnetic layer 29 between the pinned layer 36 and the free layer 35 compared to the prior art. It is further possible to improve a magnetoresistive-effect change for the spin-valve film 21.

While the surface oxidation layer 26 is formed by oxidizing the surface of the non-magnetic intermediate layer 25, the thickness of the surface oxidation layer 26 generally should be 0.4 nm or less.

Several methods are available for forming the surface oxidation layer 26 by oxidizing the surface of the non-magnetic intermediate layer 25. For example, one method exposes the non-magnetic intermediate layer 25 to an oxygen atmosphere having a pressure lower than the atmospheric pressure. There is also provided the plasma oxidization method including ECR (electron cyclotron resonance) and the ICP (inductively coupled plasma).

The non-magnetic layer 29 is formed of a conductive non-magnetic material such as, say, Cu, Cu—Ni alloy, or the like. Forming the non-magnetic layer 29 between the pinned layer 36 and the free layer 35 provides the giant magnetoresistivity on the spin-valve film 21. As mentioned above, the non-magnetic layer 29 can be thinner than the non-magnetic layer between the pinned layer and the free layer on the conventional spin-valve film. More specifically, it is desirable to set the non-magnetic layer 29's thickness to approximately 2 nm.

The pinned layer 36 is exchange-coupled to the antiferromagnetic layer 33 to fix the magnetization direction. The pinned layer 36 comprises the fourth ferromagnetic layer 30, the second non-magnetic layer 31, and the fifth ferromagnetic layer 32 to form the layered ferrimagnetic structure. Like the first ferromagnetic layer 24, the second ferromagnetic layer 27, and the third ferromagnetic layer 28, the fourth ferromagnetic layer 30 and the fifth ferromagnetic layer 32 are formed of magnetic materials showing good soft magnetic characteristics. The second non-magnetic layer 31 is a non-magnetic layer formed in the middle of the layered ferrimagnetic structure and is capable of using Ru, Rh, Ir, Re, and the like.

Providing the pinned layer 36 with the layered ferrimagnetic structure decreases a magnetic moment on the pinned layer 36 and also decreases demagnetization applied to the free layer 35.

In this spin-valve film 21, the pinned layer 36 is provided in contact with the antiferromagnetic layer 33. Consequently, the pinned layer 36 is magnetized in a given direction due to an exchange coupling force generated between the pinned layer 36 and the antiferromagnetic layer 33. Since the non-magnetic layer 29 is formed between the free layer 35 and the pinned layer 36, the free layer 35's magnetization direction easily rotates in response to a slight external magnetic field.

When an external magnetic field is applied to the thus configured spin-valve film 21, a magnetization direction of the free layer 35 is determined according to this external magnetic field's direction and intensity. The spin-valve film 21 provides the maximum electrical resistance when the magnetization direction of the free layer 35 differs from that of the pinned layer 36 by 180°. The spin-valve film 21 provides the minimum electrical resistance when the magnetization direction of the free layer 35 matches that of the pinned layer 36.

Accordingly, the spin-valve film 21's electrical resistance varies with an applied external magnetic field. It is possible to detect an external magnetic field by reading this resistance change.

As will be clearly understood from the above description, the spin-valve film 21 contains the free layer 35 having the layered ferrimagnetic structure. The free layer 35 includes the surface oxidation layer 26 formed by oxidizing the surface of the non-magnetic intermediate layer 25. This formation easily generates spin-dependent scattering. Further, it is possible to thin the nonmagnetic layer 29 between the pinned layer 36 and the free layer 35. Owing to these features, the spin-valve film 21 improves a magnetoresistive-effect change and provides good sensitivity against an external magnetic field.

The above description relates to the spin-valve film 21 which uses the pinned layer 36 having the layered ferrimagnetic structure. It is to be distinctly understood that the present invention is not limited thereto but may be applicable to the pinned layer 36 having a single layer.

The above-mentioned magnetoresistive-effect thin film is applicable to a magnetoresistive-effect element. The magnetoresistive-effect element according to the present invention comprises a magnetoresistive-effect thin film having a high magnetoresistive-effect change. As will be described later, there is provided an MR head as an example of the device using the magnetoresistive-effect element.

The following describes an MR head according to the present invention. The following description applies to a case where the MR head according to the present invention is applied to a composite magnetic head 40. It should be noted that the composite magnetic head 40 is used for hard disks.

Figure 4:
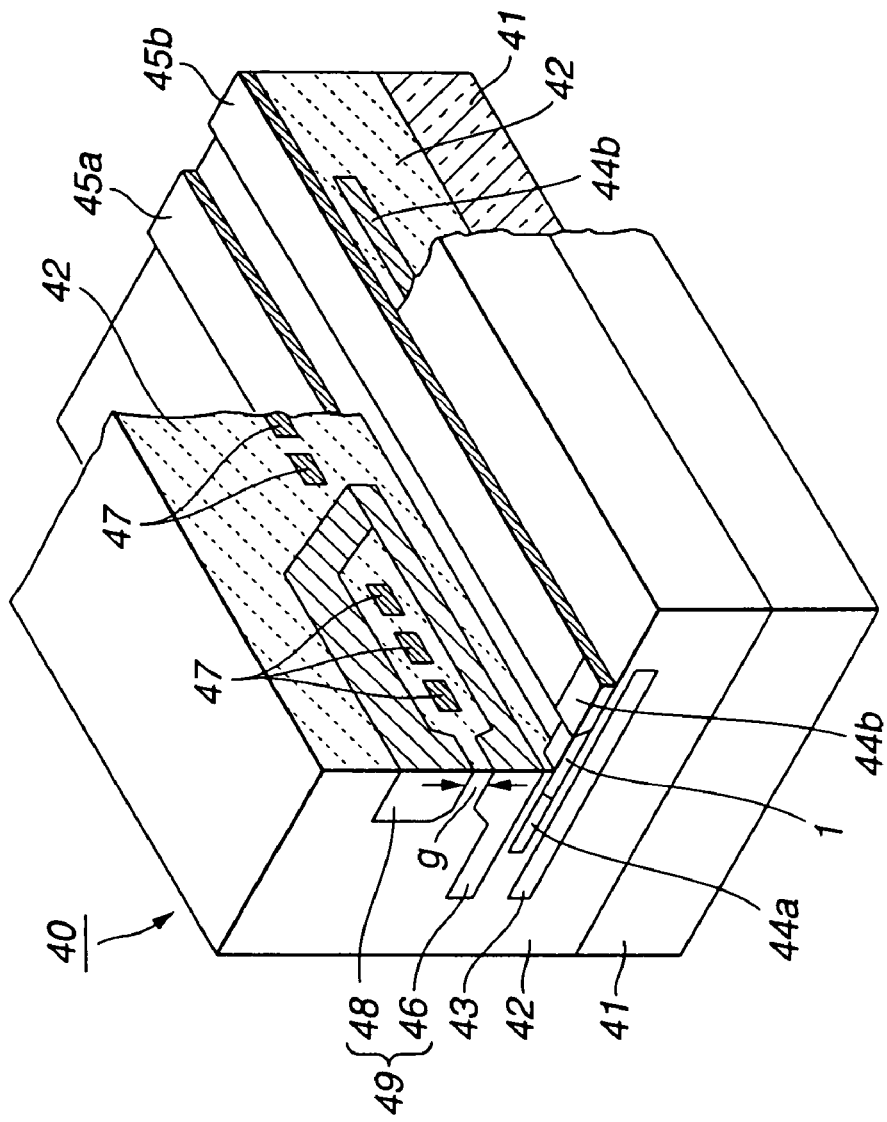
FIG. 4 is a cross sectional and broken view of an MR head fabricated by using a spin-valve film according to the present invention.

As shown in FIG. 4, the composite magnetic head 40 comprises an MR head and an inductive magnetic head. The inductive magnetic head is layered on the MR head. The MR head is provided as a reproduction head. The inductive magnetic head is provided as a recording head.

First, the MR head is described.

In the MR head, a first magnetic shield layer 43 is formed on a substrate 41 through the intermediary of an insulation layer 42. On this first magnetic shield layer 43, the above-mentioned spin-valve film 1 is formed through the intermediary of the insulation layer 42. There are formed bias layers 44a and 44b in a longer direction of the spin-valve film 1. There are formed connection terminals 45a and 45b in contact with the bias layers 44a and 44b. A second magnetic shield layer 46 is formed on the bias layers 44a and 44b and the connection terminals 45a and 45b through the intermediary of the insulation layer 42.

The substrate 41 comprises a highly hard non-magnetic material. The highly hard non-magnetic material includes, say, alumina-titanium carbide (AlTiC). The substrate 41's edge forms an ABS (Air Bearing Surface) facing a disk-shaped storage medium.

The insulation layer 42 is formed of an insulation material. The insulation material includes, say, $Al_2O_3$, $SiO_4$, and the like. The composite magnetic head 40 is fabricated with layers. The insulation layer 42 actually comprises a plurality of layers. However, an illustration thereof is omitted here.

The first magnetic shield layer 43 and the second magnetic shield layer 46 function so that the spin-valve film 1 rejects magnetic fields not for reproduction out of signal magnetic fields from a magnetic storage medium. Namely, a magnetic field not for reproduction is led to the first magnetic shield layer 43 and the second magnetic shield layer 46. Only a signal magnetic field for reproduction is led to the spin-valve film 1. This aims at improving high-frequency characteristics and read resolution of the spin-valve film 1. As will be described later, the second magnetic shield layer 46 also functions as a lower-layer core.

The first magnetic shield layer 43 and the second magnetic shield layer 46 are formed of a soft magnetic material. The soft magnetic material includes, say, Sendust (Fe—Al—Si alloy), FeTa, and Co-based amorphous material. The first magnetic shield layer 43 and the second magnetic shield layer 46 may have the layered structure comprising two or more magnetic thin-film layers by alternately layering a soft magnetic thin-film layer and a non-magnetic thin-film layer both made from a Co-based amorphous material.

The spin-valve film 1 is a magnetic sensor which senses a signal magnetic field from the magnetic storage medium. As mentioned above, the spin-valve film 1 comprises the base layer 3, the antiferromagnetic layer 4, the first ferromagnetic layer 5, the non-magnetic intermediate layer 6, the surface oxidation layer 7, the second ferromagnetic layer 8, the non-magnetic layer 9, the free layer 10 and the protective layer 11 which are successively layered. In FIG. 4, however, an illustration of each layer is omitted.

As mentioned above, the surface oxidation layer 7 is formed by oxidizing the non-magnetic intermediate layer 6's surface. Further, it is desirable to form the non-magnetic intermediate layer 6 of Ru. Moreover, the surface oxidation layer 7 is formed of Ru—O because it is formed by oxidizing the non-magnetic intermediate layer 6's surface.

Thus, the pinned layer 12 having the layered ferrimagnetic structure includes the surface oxidation layer formed by oxidizing the non-magnetic intermediate layer 6's surface. Because of this, the spin-valve film 1 increases probability of a spin-dependent scattering occurrence and improves a magnetoresistive-effect change. It is possible to thin the non-magnetic layer 9 between the pinned layer 12 and the free layer 10, further improving a magnetoresistive-effect change. Since the MR head 20 comprises the spin-valve film 1 with a high magnetoresistive-effect change, this head improves sensitivity against magnetic fields from an information storage medium and provides excellent reproduction outputs.

While the surface oxidation layer 7 is formed by oxidizing the surface of the non-magnetic intermediate layer 6, the thickness of the surface oxidation layer 7 generally should be 0.4 nm or less.

A pair of bias layers 44a and 44b provides a function for applying a bias magnetic field to the spin-valve film 1 and forcing a single domain to a magnetic domain of each ferromagnetic layer in the spin-valve film 1. This function also supplies a sense current to the spin-valve film 1. The bias layers 44a and 44b each are electrically and magnetically connected to both ends of the spin-valve film 1.

The bias layers 44a and 44b are formed of a hard magnetic material at both ends of the spin-valve film 1 in a longer direction. This hard magnetic material includes, say, CoNiPt, CoCrPt, and the like. It may be preferable to form an electrode layer on the bias layers 44a and 44b.

The connection terminals 45a and 45b provide the bias layers 44a and 44b with a sense current. The connection terminals 45a and 45b are formed in a thin film made from a conductive and low-resistance metal material. Preferable materials for the connection terminals 45a and 45b are, say, Cr, Ta, Ti, W, Mo, Cu, and the like.

The following describes the inductive magnetic head.

The inductive magnetic head comprises the thin-film coil 47 which is embedded in the insulation layer 42 and is formed on the second magnetic shield layer 46. The insulation layer 42 is formed around the thin-film coil 47. The upper-layer core 48 is formed on the insulation layer 42 in which the thin-film coil 47 is embedded. The second magnetic shield layer 46 and the upper-layer core 48 form the magnetic core 49.

The thin-film coil 47 records information onto a magnetic storage medium according to a change in a recording current supplied from an external connection terminal (not shown). The thin-film coil 47 is formed so that it is wound around the magnetic core 49. Both ends of the thin-film coil 47 are exposed externally. The above-mentioned external connection terminals are formed at these ends. The thin-film coil 47 is formed of a conductive material such as copper.

The upper-layer core 48 and the second magnetic shield layer 46 form a closed magnetic circuit and function as the magnetic core 49 for the inductive magnetic head. At the front end, the upper-layer core 48 and the second magnetic shield layer 46 are exposed to the ABS and are separated to form a specified gap g. At the rear end, the upper-layer core 48 and the second magnetic shield layer 46 are formed so that they contact with each other. The gap g is used for a recording gap of the inductive magnetic head. The upper-layer core 48 is formed of a soft magnetic material such as NiFe and the like.

As will be clearly understood from the above description, the above-mentioned MR head indicates a high probability of causing spin-dependent scattering. Accordingly, this MR head is formed of the spin-valve film 1 having a large magnetoresistive-effect change. Because of this, the MR head provides good sensitivity against a magnetic field from an information storage medium, produces a high output during information reproduction, and is thus appropriate for high-density recording.

The above description explains the case where the MR head uses the so-called bottom-type spin-valve film 1 described as the first embodiment. The present invention is not limited thereto. For example, the MR head can also use the so-called top-type spin-valve film 21 described as the second embodiment.

The above description exemplifies the MR head as a device which uses the magnetoresistive-effect element. The magnetoresistive-effect element according to the present invention can be applied to devices other than the MR head. Specifically, the magnetoresistive-effect element according to the present invention is also applicable to magnetic sensors and the like such as a geomagnetic direction sensor.

As will be clearly understood from the above description, the bottom-type spin-valve film 1 contains the pinned layer 12 having the layered ferrimagnetic structure. The pinned layer 12 includes the surface oxidation layer 7 formed by oxidizing the surface of the non-magnetic intermediate layer 6. This formation easily generates spin-dependent scattering. Further, it is possible to thin the non-magnetic layer 9 between the free layer 10 and the pinned layer 12. Owing to these features, the spin-valve film 1 improves a magnetoresistive-effect change aid provides good sensitivity against an external magnetic field.

As will be clearly understood from the above description, the spin-valve film 21 contains the free layer 35 having the layered ferrimagnetic structure. The free layer 35 includes the surface oxidation layer 26 formed by oxidizing the surface of the non-magnetic intermediate layer 25. This formation easily generates spin-dependent scattering. Further, it is possible to thin the non-magnetic layer 29 between the free layer 35 and the pinned layer 36. Owing to these features, the spin-valve film 21 improves a magnetoresistive-effect change and provides good sensitivity against an external magnetic field.

The MR head according to the present invention is formed of the so-called bottom-type spin-valve film 1 or the so-called top-type spin-valve film 21. Because of this, the MR head provides good sensitivity against a magnetic field from an information storage medium and produces a high output during information reproduction. Accordingly, the MR head according to the present invention is appropriate for high-density recording.

EXAMPLES

The following describes specific embodiments according to the present invention based on experiment results.

First, The following describes improvement of a resistance variation and a magnetoresistive-effect change in the bottom-type spin-valve film according to the above-mentioned first embodiment based on the first embodiment and a comparative example 1.

Example 1

First, sputtering or the like is used to successively form a Ta layer, an NiFe layer, and a PtMn layer on a glass substrate. Layer thicknesses are set to 5 nm for the Ta layer, 2 nm for the NiFe layer, and 20 nm for the PtMn layer.

Then, sputtering or the like is used to successively form a CoFe layer and an Ru layer on the PtMn layer. Layer thicknesses are set to 1.1 nm for the CoFe layer and 0.8 nm for the Ru layer.

The Ru layer's surface is oxidized to form an Ru—O layer by exposing this surface to an oxygen atmosphere having a pressure lower than the atmospheric pressure.

Then, sputtering or the like is used to successively form a CoFe layer, a Cu layer, and a CoFe layer on the Ru—O layer for creating a spin-valve film. Layer thicknesses are set to 2.2 nm for the CoFe layer and 3.2 m for the Cu layer formed on the Ru—O layer. A layer thickness is set to 2.5 nm for the CoFe layer formed on the Cu layer. Thereafter, heat treatment is applied to the PtMn layer at 265° C. for 4 hours to regulate this layer.

Comparative Example 1

A spin-valve film is fabricated in the same manner as for the first example except that the Ru layer surface is not oxidized. Namely, the spin-valve film for the comparative example 1 does not have a surface oxidation layer made from Ru—O.

Resistance variations are measured and magnetoresistive-effect changes are computed when a magnetic field is applied to the spin-valve films fabricated for the first example and the comparative example 1.

When evaluating spin-valve film characteristics, an MR ratio and dR/square are used as evaluation parameters. The MR ratio is a magnetoresistive-effect change in the spin-valve film. The dR/square denotes a resistance variation per unit area on the spin-valve film.

Figure 5:
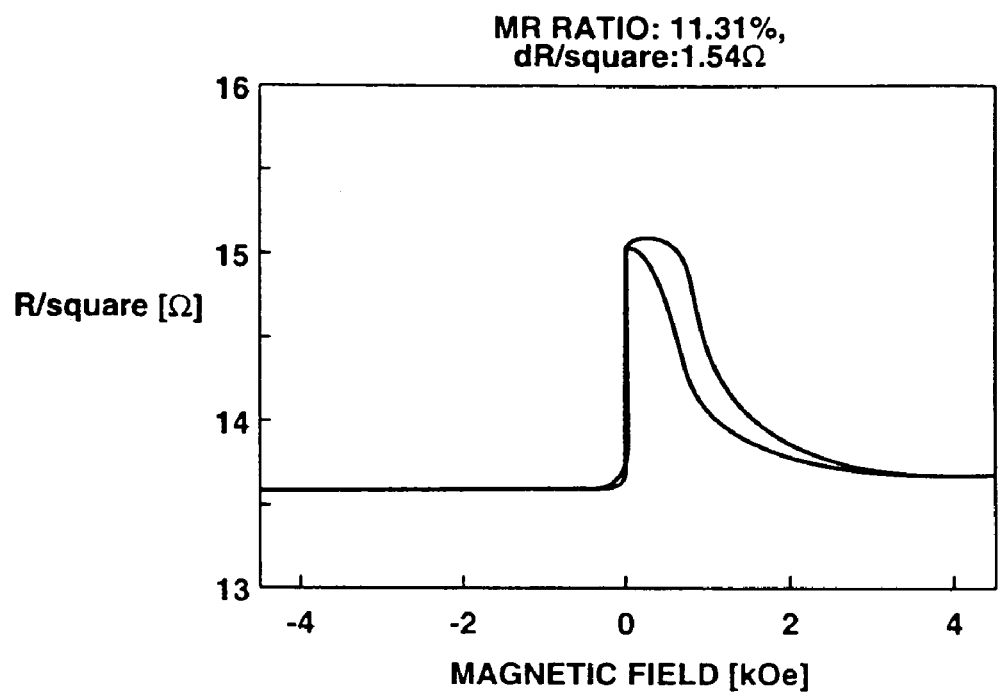
FIG. 5 shows a result of measuring a magnetoresistive-effect curve of a spin-valve film fabricated for a first example.
Figure 6:
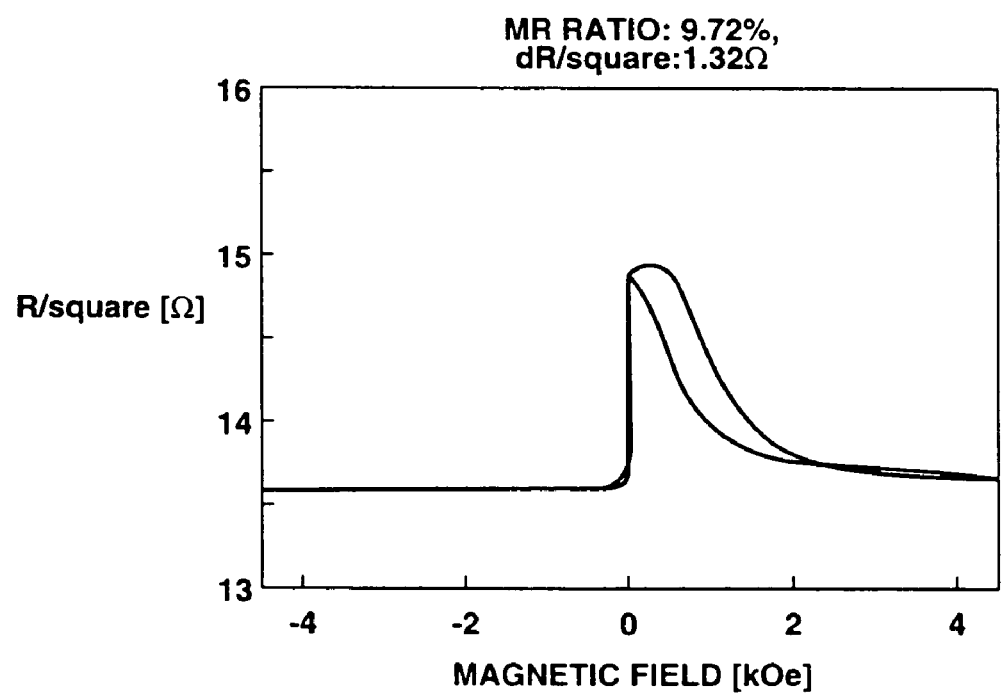
FIG. 6 shows a result of measuring a magnetoresistive-effect amount for a spin-valve film fabricated for a comparative example 1 without oxidizing an Ru layer.

FIG. 5 shows dR/square and the MR ratio when a magnetic field is applied to the first example. FIG. 6 shows dR/square and the MR ratio when a magnetic field is applied to the comparative example 1.

As shown in FIGS. 5 and 6, it has been found that the spin-valve film having the Ru—O layer for the first example causes more resistance variation than the comparative example 1. Further, it has been found that the spin-valve film having the Ru—O layer for the first example causes more magnetoresistive-effect change than the comparative example 1. Specifically, the spin-valve film having the Ru—O layer for the first example shows values as large as 11.31% of the MR ratio and 1.54 Ω of the dR/square.

According to these measurements, it has been found that the magnetoresistive-effect change can be improved by using the layered ferrimagnetic structure for pinned layers of the bottom-type spin-valve film and forming a surface oxidation layer of Ru—O in the layered ferrimagnetic structure.

Then, with respect to the second example, the following describes a thickness of the Ru—O layer formed in accordance with an Ru layer thickness, and also relationship between the Ru layer thickness and a coercive force for the entire thin film.

Example 2

First, a Cu layer, a CoFe layer, and an Ru layer are successively formed on a glass substrate to form a thin film. A plurality of thin films is fabricated by changing thicknesses of the Ru layer. Each thin film is exposed to the atmospheric air to oxidize the Ru layer. A coercive force is measured for each thin film.

Figure 7:
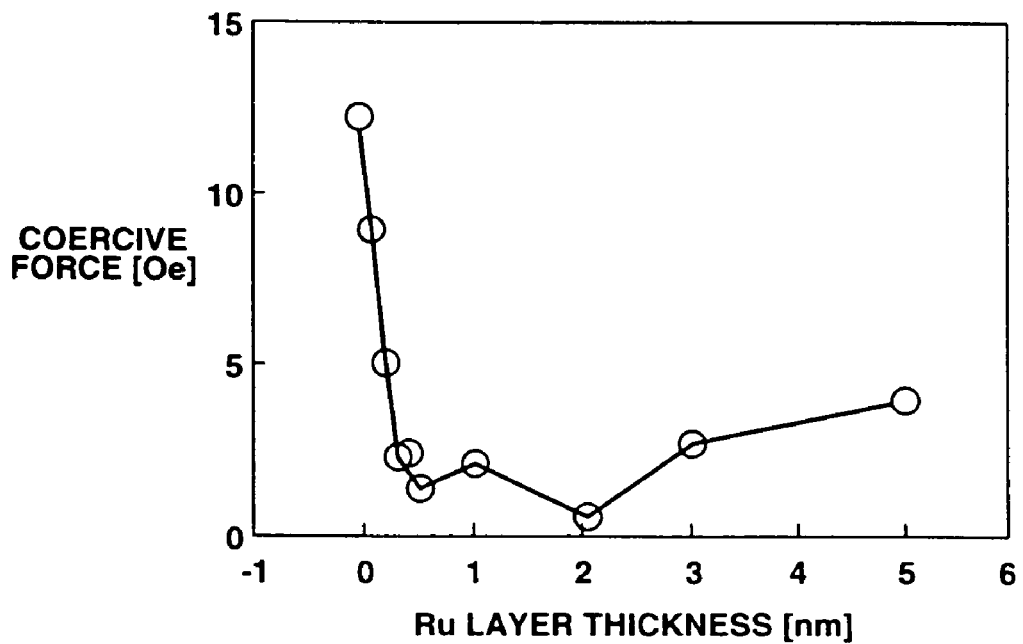
FIG. 7 shows relationship between an Ru thickness and a coercive force for the entire thin film.

FIG. 7 shows a result of the second example. According to this result, it has been found that the coercive force for the entire thin film drastically increases by setting the Ru layer thickness to 0.4 nm or less. It has been suggested that setting the Ru layer thickness to 0.4 nm or less progresses oxidation not only to the Ru layer, but also to the underlying CoFe layer. Meanwhile, it has been found that the entire thin film maintains a relatively low coercive force when the Ru layer thickness exceeds 0.4 nm. It has been suggested that thickening the Ru layer over 0.4 nm prevents oxidization to the underlying CoFe layer and oxidizes the Ru layer halfway.

Accordingly, it has been found that the Ru layer is oxidized just to the depth of 0.4 nm from the surface when it is exposed in an oxygen atmosphere with a pressure below the atmospheric pressure. In other words, it has been clear that the thickness of the Ru—O layer formed by oxidizing the Ru layer surface should be 0.4 nm or less.

Then, the following describes improvement of a resistance variation and a magnetoresistive-effect change in the top-type spin-valve film according to the above-mentioned second embodiment based on a third example and a comparative example 2. Also described are effects of thinning the Cu layer between the pinned layer and the free layer on a resistance variation and a magnetoresistive-effect change based on a fourth example and a comparative example 3.

Example 3

First, sputtering or the like is used to successively form a Ta layer, an NiFe layer, and an Ru layer on a glass substrate. Layer thicknesses are set to 5 nm for the Ta layer, 2 nm for the NiFe layer, and 0.8 nm for the Ru layer.

The Ru layer's surface is oxidized to form an Ru—O layer by exposing this surface to an oxygen atmosphere having a pressure lower than the atmospheric pressure.

Then, sputtering or the like is used to successively form an NiFe layer, a CoFe layer, a Cu layer, a CoFe layer, an Ru layer, a CoFe layer, a PtMn layer, and a Ta layer on the Ru—O layer for creating a spin-valve film. Layer thicknesses are set to 1 nm for the NiFe layer formed on the Ru—O layer, 2 nm for the CoFe layer formed on the NiFe layer, 3.2 nm for the Cu layer, 2.2 nm for the CoFe layer formed on the Cu layer, 0.8 nm for the Ru layer, formed on the CoFe layer, 1.1 nm for the CoFe layer formed on the Ru layer, 20 nm for the PtMn layer, and 5 nm for the Ta layer formed on the PtMn layer. Thereafter, heat treatment is applied to the PtMn layer at 265° C. for 4 hours to regulate this layer.

Comparative Example 2

A spin-valve film is fabricated in the same manner as for the second example except that the Ru layer surface is not oxidized.

Example 4

A spin-valve film is fabricated in the same manner as for the third example except that a layer thickness is set to 2.2 nm for the Cu layer between the pinned layer and the free layer.

Comparative Example 3

A spin-valve film is fabricated in the same manner as for the comparative example 2 except that a layer thickness is set to 2.2 nm for the Cu layer between the pinned layer and the free layer.

Resistance variations are measured and magnetoresistive-effect changes are computed when a magnetic field is applied to the spin-valve films fabricated for the third example, the comparative example 2, the fourth example, and the comparative example 3.

Figure 8:
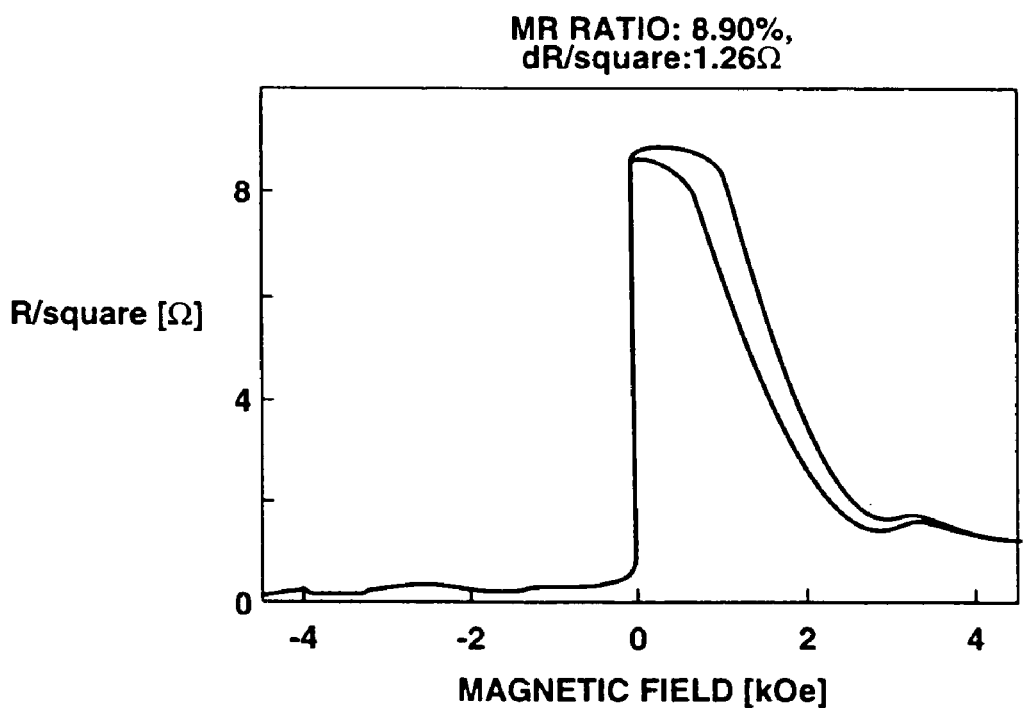
FIG. 8 shows a result of measuring a magnetoresistive-effect curve of a spin-valve film fabricated for a third example.
Figure 9:
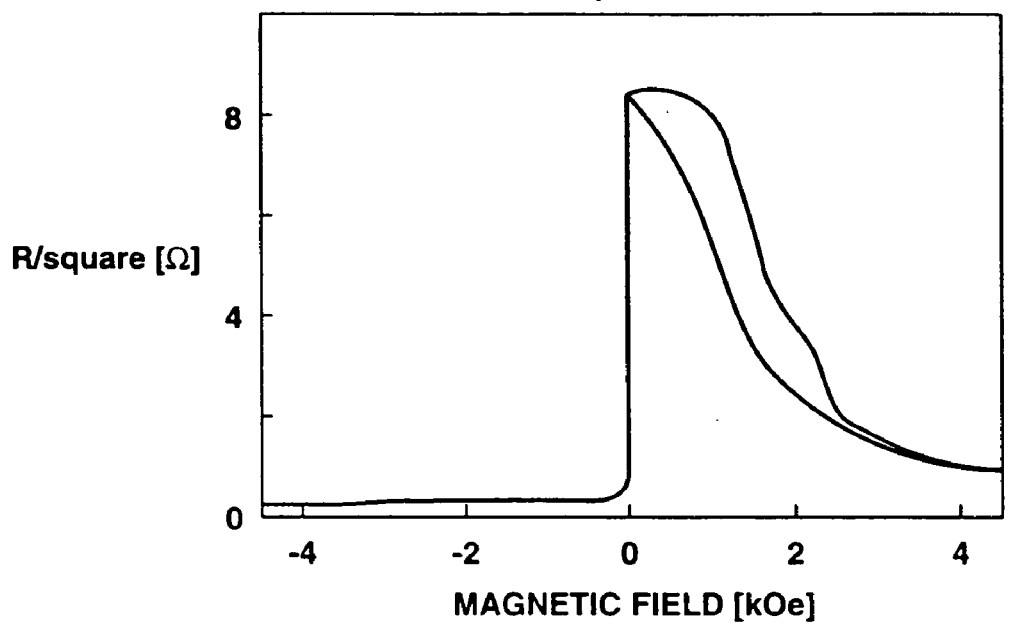
FIG. 9 shows a result of measuring a magnetoresistive-effect curve of a spin-valve film fabricated for a comparative example 2.
Figure 10:
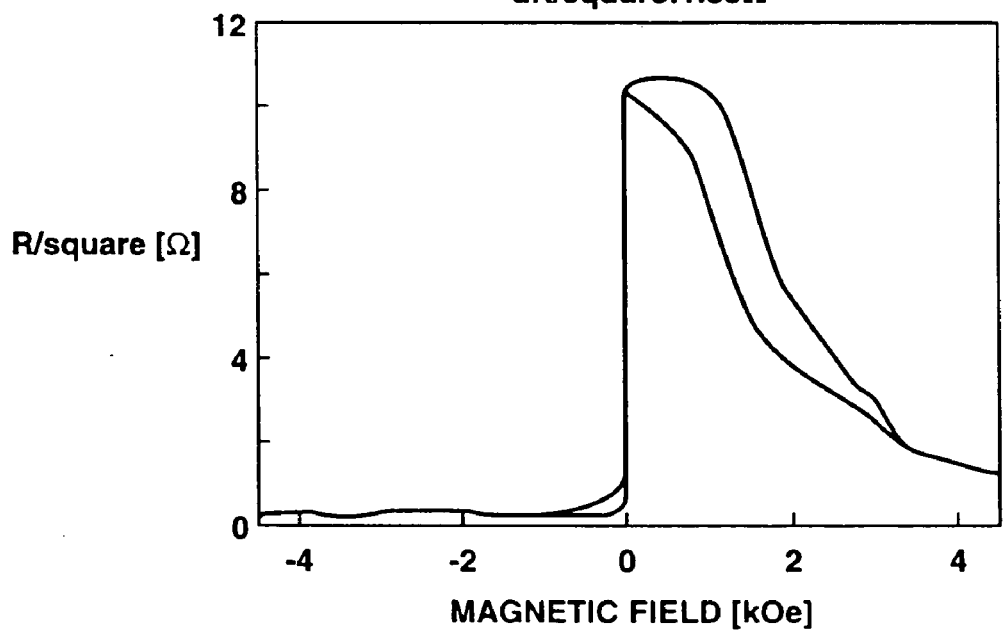
FIG. 10 shows a result of measuring a magnetoresistive-effect curve of a spin-valve film fabricated for a fourth example.
Figure 11:
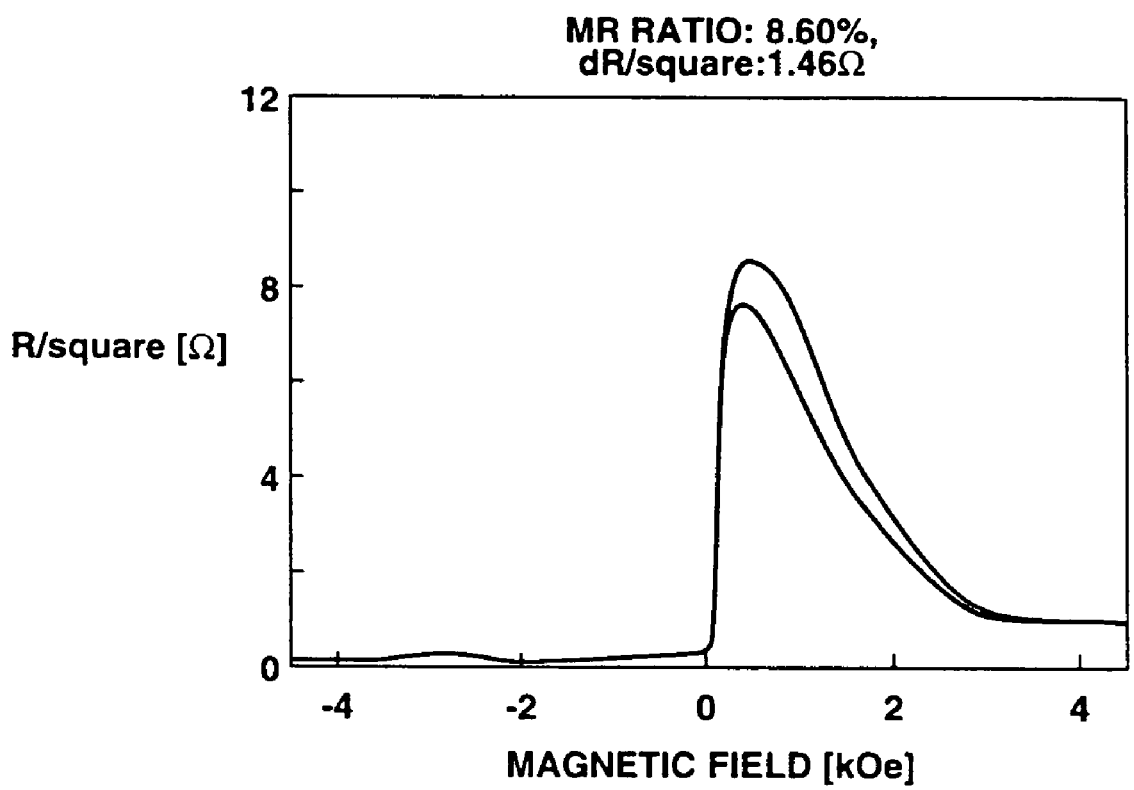
FIG. 11 shows a result of measuring a magnetoresistive-effect curve of a spin-valve film fabricated for a comparative example 3.

FIG. 8 shows dR/square and the MR ratio when a magnetic field is applied to the third example. FIG. 9 shows dR/square and the MR ratio when a magnetic field is applied to the comparative example 2. FIG. 10 shows dR/square and the MR ratio when a magnetic field is applied to the fourth example FIG. 11 shows dR/square and the MR ratio when a magnetic field is applied to the comparative example 3.

As shown in FIGS. 8 and 9, it has been found that the spin-valve film having the Ru—O layer for the third example causes more resistance variation than the comparative example 2 without the Ru—O layer. Further, it has been found that the spin-valve film having the Ru—O layer for the third example causes more magnetoresistive-effect change than the comparative example 2 without the Ru—O layer.

Moreover, as shown in FIG. 10, it has been found that the fourth example using the thin Cu layer with a thickness of 2.2 nm drastically improves a resistance variation and a magnetoresistive-effect change compared to the third example using the Cu layer with a thickness of 3.2 nm. Meanwhile, as shown in FIG. 11, the comparative example 3 without the Ru—O layer uses the thin Cu layer with a thickness of 2.2 nm. The comparative example 3 shows very slight improvement in the magnetoresistive-effect change compared to the comparative example 2 using the Cu layer with a thickness of 3.2 nm without the Ru—O layer. Specifically, the fourth example using the Cu layer with a thickness of 2.2 nm indicates the MR ratio of 10.6% and the dR/square of 1.85 Ω. The third example using the Cu layer with a thickness of 3.2 nm indicates the MR ratio of 8.90% and the dR/square of 1.26 Ω.

According to this experiment, it has been found that the magnetoresistive-effect change can be improved by using the layered ferrimagnetic structure for the free layer in the top-type spin-value film and forming the surface oxidation layer of Ru—O in this layered ferrimagnetic structure. Further, it has been found that the magnetoresistive-effect change remarkably improves by thinning the non-magnetic layer between the pinned layer and the free layer.

What is claimed is:
1. A magnetoresistive-effect element comprising:
   a substrate formed of a nonmagnetic nonconductive material;
   a base layer formed of a nonmagnetic conductive material on said substrate;
   a free layer formed on said base layer, said free layer comprising:
      a first ferromagnetic layer;

a non-magnetic intermediate layer formed on said first ferromagnetic layer;
a surface oxidation layer formed on a surface of said non-magnetic intermediate layer;
a second ferromagnetic layer formed on said surface oxidation layer; and
a third ferromagnetic layer formed on said second ferromagnetic layer;
a non-magnetic layer formed on said free layer;
a pinned layer formed on said non-magnetic layer; said pinned layer comprising:
a fourth ferromagnetic layer;
a second non-magnetic intermediate layer;
a fifth ferromagnetic layer formed on said second non-magnetic intermediate layer; and
an antiferromagnetic layer formed on said pinned layer.

2. The magnetoresistive-effect thin film according to claim 1, wherein said non-magnetic intermediate layer is formed of Ru.

3. The magnetoresistive-effect element according to claim 1, wherein said surface oxidation layer has a thickness of no more than 0.4 nm.

4. A magnetoresistive-effect magnetic head comprising:
a pair of zonal magnetic shield members,
a magnetoresistive-effect thin film formed between said pair of magnetic shield members,
a pair of bias layers formed at both ends of said magnetoresistive-effect thin film along a longer direction, and
a pair of thin-film lead electrodes each formed just on said bias layer on a substrate,
wherein said magnetoresistive-effect thin film comprises:
a substrate formed of a nonmagnetic nonconductive material;
a base layer formed of a nonmagnetic conductive material on said substrate;
a free layer formed on said base layer, said free layer comprising:
a first ferromagnetic layer;
a non-magnetic intermediate layer formed on said first ferromagnetic layer;
a surface oxidation layer formed on a surface of said non-magnetic intermediate layer;
a second ferromagnetic layer formed on said surface oxidation layer; and
a third ferromagnetic layer formed on said second ferromagnetic layer;
a non-magnetic layer formed on said free layer;
a pinned layer formed on said non-magnetic layer; said pinned layer comprising:
a fourth ferromagnetic layer;
a second non-magnetic intermediate layer;
a fifth ferromagnetic layer formed on said second non-magnetic intermediate layer; and
an antiferromagnetic layer formed on said pinned layer.

5. The magnetoresistive-effect magnetic head according to claim 4, wherein said non-magnetic intermediate layer is formed of Ru.

6. The magnetoresistive-effect magnetic head according to claim 4, wherein said surface oxidation layer has a thickness of no more than 0.4 nm.

* * * * *